US008502807B2

(12) United States Patent
Tsao et al.

(10) Patent No.: US 8,502,807 B2
(45) Date of Patent: Aug. 6, 2013

(54) SIGNAL TRANSMISSION SYSTEM OF A FLAT PANEL DEVICE

(75) Inventors: Wen-Yuan Tsao, Hsinchu County (TW); Che-Li Lin, Taipei (TW); Chi-Ming Yuan, Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 763 days.

(21) Appl. No.: 12/329,640

(22) Filed: Dec. 8, 2008

(65) Prior Publication Data

US 2009/0267925 A1 Oct. 29, 2009

(30) Foreign Application Priority Data

Apr. 25, 2008 (TW) ............................... 97115298 A

(51) Int. Cl.
*G06F 3/038* (2006.01)

(52) U.S. Cl.
USPC ........................................... 345/204; 345/211

(58) Field of Classification Search
USPC ...... 345/87, 76, 60, 41–42, 30, 204, 211–214
See application file for complete search history.

(56) References Cited

U.S. PATENT DOCUMENTS

| | | | | | |
|---|---|---|---|---|---|
| 5,512,853 | A * | 4/1996 | Ueno et al. | .................... | 327/333 |
| 2002/0008682 | A1 | 1/2002 | Park | | |
| 2003/0071799 | A1* | 4/2003 | Myers | ........................... | 345/204 |
| 2003/0164811 | A1* | 9/2003 | Kim et al. | ....................... | 345/87 |
| 2004/0085279 | A1 | 5/2004 | Kim | | |

* cited by examiner

*Primary Examiner* — Christopher E Leiby
(74) *Attorney, Agent, or Firm* — Winston Hsu; Scott Margo

(57) ABSTRACT

A signal transmission system of a flat panel device includes an encoder, a transmitter, a receiver, and a decoder. The encoder converts a digital signal to a switch control signal. The transmitter includes 4n signal-lines for transmitting a current signal according to the switch control signal. The receiver includes 4n terminations, a plurality of terminal resistors, and a plurality of comparators. The receiver generates a group of voltage levels according to the current signal. Each comparator is coupled between any two terminations so as to generate a group of voltage differences. The decoder converts the group of voltage differences to the digital signal.

8 Claims, 13 Drawing Sheets

| Encoder | | | | | | | | | | | | | | | | | | | | |
|---|---|---|---|---|---|---|---|---|---|---|---|---|---|---|---|---|---|---|---|---|
| Digital signal | | | | Case | Tx Switch | | | | | | | | | | | | | | | |
| D4 | D3 | D2 | D1 | | P1 | P2 | P3 | P4 | P5 | P6 | P7 | P8 | N1 | N2 | N3 | N4 | N5 | N6 | N7 | N8 |
| 0 | 1 | 1 | 1 | 1 | 0 | 1 | 0 | 0 | 0 | 0 | 0 | 1 | 1 | 0 | 0 | 0 | 0 | 0 | 1 | 0 |
| 0 | 0 | 1 | 1 | 2 | 1 | 0 | 0 | 0 | 0 | 0 | 0 | 1 | 0 | 1 | 0 | 0 | 0 | 0 | 1 | 0 |
| 0 | 1 | 0 | 0 | 3 | 0 | 1 | 0 | 0 | 0 | 0 | 1 | 0 | 1 | 0 | 0 | 0 | 0 | 0 | 0 | 1 |
| 0 | 0 | 0 | 0 | 4 | 1 | 0 | 0 | 0 | 0 | 0 | 1 | 0 | 0 | 1 | 0 | 0 | 0 | 0 | 0 | 1 |
| 0 | 1 | 1 | 0 | 5 | 0 | 0 | 0 | 1 | 0 | 1 | 0 | 0 | 0 | 0 | 1 | 0 | 1 | 0 | 0 | 0 |
| 0 | 0 | 1 | 0 | 6 | 0 | 0 | 0 | 1 | 1 | 0 | 0 | 0 | 0 | 0 | 1 | 0 | 0 | 1 | 0 | 0 |
| 0 | 1 | 0 | 1 | 7 | 0 | 0 | 1 | 0 | 0 | 1 | 0 | 0 | 0 | 0 | 0 | 1 | 1 | 0 | 0 | 0 |
| 0 | 0 | 0 | 1 | 8 | 0 | 0 | 1 | 0 | 1 | 0 | 0 | 0 | 0 | 0 | 0 | 1 | 0 | 1 | 0 | 0 |
| 1 | 1 | 0 | 0 | 9 | 0 | 0 | 0 | 1 | 0 | 1 | 0 | 0 | 1 | 0 | 0 | 0 | 0 | 0 | 1 | 0 |
| 1 | 0 | 0 | 0 | 10 | 1 | 0 | 0 | 0 | 0 | 0 | 1 | 0 | 0 | 0 | 0 | 1 | 0 | 1 | 0 | 0 |
| 1 | 0 | 0 | 1 | 11 | 0 | 1 | 0 | 0 | 0 | 0 | 0 | 1 | 0 | 0 | 1 | 0 | 1 | 0 | 0 | 0 |
| 1 | 0 | 1 | 0 | 12 | 0 | 0 | 1 | 0 | 1 | 0 | 0 | 0 | 0 | 1 | 0 | 0 | 0 | 0 | 0 | 1 |
| 1 | 0 | 1 | 1 | 13 | 0 | 0 | 1 | 0 | 0 | 0 | 0 | 1 | 0 | 1 | 0 | 0 | 1 | 0 | 0 | 0 |
| 1 | 1 | 0 | 1 | 14 | 0 | 1 | 0 | 0 | 1 | 0 | 0 | 0 | 0 | 0 | 1 | 0 | 0 | 0 | 0 | 1 |
| 1 | 1 | 1 | 0 | 15 | 1 | 0 | 0 | 0 | 0 | 1 | 0 | 0 | 0 | 0 | 0 | 1 | 0 | 0 | 1 | 0 |
| 1 | 1 | 1 | 1 | 16 | 0 | 0 | 0 | 1 | 0 | 0 | 1 | 0 | 1 | 0 | 0 | 0 | 0 | 1 | 0 | 0 |

FIG. 12

| Rx Comparator part | | | | | | Case | Digital signal | | | |
|---|---|---|---|---|---|---|---|---|---|---|
| A-B | B-D | A-C | C-D | A-D | B-C | | D4 | D3 | D2 | D1 |
| 1 | 1 | 1 | 1 | 1 | 1 | 1 | 0 | 1 | 1 | 1 |
| 1 | 1 | 1 | 1 | 1 | 0 | 2 | 0 | 0 | 1 | 1 |
| 0 | 0 | 0 | 0 | 0 | 1 | 3 | 0 | 1 | 0 | 0 |
| 0 | 0 | 0 | 0 | 0 | 0 | 4 | 0 | 0 | 0 | 0 |
| 0 | 1 | 1 | 0 | 1 | 1 | 5 | 0 | 1 | 1 | 0 |
| 1 | 0 | 0 | 1 | 1 | 0 | 6 | 0 | 0 | 1 | 0 |
| 0 | 1 | 1 | 0 | 0 | 1 | 7 | 0 | 1 | 0 | 1 |
| 1 | 0 | 0 | 1 | 0 | 0 | 8 | 0 | 0 | 0 | 1 |
| 0 | 1 | 1 | 1 | 1 | 1 | 9 | 1 | 1 | 0 | 0 |
| 1 | 0 | 0 | 0 | 0 | 0 | 10 | 1 | 0 | 0 | 0 |
| 1 | 1 | 1 | 0 | 1 | 1 | 11 | 1 | 0 | 0 | 1 |
| 0 | 0 | 0 | 1 | 0 | 0 | 12 | 1 | 0 | 1 | 0 |
| 1 | 0 | 1 | 0 | 1 | 1 | 13 | 1 | 0 | 1 | 1 |
| 0 | 1 | 0 | 1 | 0 | 0 | 14 | 1 | 1 | 0 | 1 |
| 0 | 1 | 0 | 1 | 1 | 1 | 15 | 1 | 1 | 1 | 0 |
| 1 | 0 | 1 | 0 | 0 | 0 | 16 | 1 | 1 | 1 | 1 |

FIG. 13

SIGNAL TRANSMISSION SYSTEM OF A FLAT PANEL DEVICE

BACKGROUND OF THE INVENTION

1. Field of the Invention

The present invention relates to a signal transmission system, and more particularly, to a signal transmission system of a flat panel device.

2. Description of the Prior Art

The traditional flat panel device includes a timing controller and a plurality of source drivers. The timing controller generates display data of the flat display after receiving image signals. The display data is transmitted to the plurality of source drivers through transmission interface. The plurality of source drivers converts the display data to driving signals so as to display the image on the flat panel device. In general, the transmission interface of the flat panel device includes transistor-transistor logic (TTL) signal, low voltage differential signal (LVDS), and reduced swing differential signal (RSDS).

Please refer to FIG. 1 and FIG. 2. FIG. 1 is a schematic diagram of circuits generating RSDS signals according to the prior art. FIG. 2 is a waveform diagram of RSDS signals. For the RSDS generation, when a current I passes through a terminal resistor R, a voltage difference I*R is generated between two ends (RSDS_P, RSDS_N) of the terminal resistor. The system includes a common mode voltage (VCM_RSDS). The voltages of two ends of the terminal resistor (VRSDS_P, VRSDS_N) have voltage difference 0.5*I*R to the common mode voltage (VCM_RSDS) so as to generate stable differential signals. As shown in FIG. 1, when the current flows from RSDS_P to RSDS_N, VRSDS_P is VCM_RSDS+0.5*I*R, and VRSDS_N is VCM_RSDS−0.5*I*R, which is defined as a high level. When the current flows in the reverse direction, VRSDS_P is VCM_RSDS−0.5*I*R, and VRSDS_N is VCM_RSDS+0.5*I*R, which is defined as low level. As shown in FIG. 2, VIH_RSDS is defined that the voltage at RSDS_P is I*R higher than at RSDS_N, and VIL_RSDS is defined that the voltage at RSDS_N is I*R higher than at RSDS_P.

In conclusion, the RSDS according to the prior art uses one pair of differential signals to transmit data. However, as the resolution of the display increases the transmission interface of the RSDS has to transmit a lot of data, so one pair of differential signals is insufficient.

SUMMARY OF THE INVENTION

According to an embodiment of the present invention, a signal transmission system of a flat panel device comprises an encoder, a first signal transmitting module, and a decoder. The encoder converts a first digital signal to a first switch control signal. The first signal transmitting module comprises a first transmitter and a first receiver. The first transmitter is coupled to the encoder, comprising N signal-lines for transmitting a first current signal, a plurality of first current sources, and a first switch module coupled between the N signal-lines and the plurality of first current sources, for controlling the connection of the N signal-lines and the plurality of first current sources according to the first switch control signal so as to adjust the value of the first current signal. The first receiver comprises N terminations coupled to the N signal-lines respectively, a plurality of first terminal resistors having first ends coupled to the N terminations respectively, for receiving the first current signal and generating a first group of voltage levels according to the first current signal, and a plurality of first comparators, each first comparator being coupled between any two terminations for generating a first group of voltage difference according to the first group of voltage levels. The decoder is coupled to the first receiver for converting the first group of voltage levels to the first digital signal. N is not smaller than 4.

According to another embodiment of the present invention, a method of signal transmission of a flat panel device, comprising converting a digital signal to a switch control signal, providing N signal-lines, determining a plurality of current loops of the N signal-lines and transmitting a set of current signals on the plurality of current loops, and converting the set of current signals to the digital signal, wherein N is not smaller than 4.

According to another embodiment of the present invention, a signal transmission system of a flat panel device comprises an encoder, a signal transmitting module, a signal receiving module, and a decoder. The encoder converts a first digital signal to a switch control signal. The signal transmitting module is coupled to the encoder, comprising N signal-lines, a plurality of current sources, and a switch module coupled between the N signal-lines and the plurality of current sources, the switch module controlling the connection of the N signal-lines and the plurality of current sources according to the switch control signal so as to transmit a plurality of current signals on a plurality of current loops of the N signal-lines. The signal receives module coupled to the signal transmitting module for receiving the plurality of current signals. The decoder is coupled to the signal receiving module for generating the digital signal according the output of the signal receiving module. N is not smaller than 4.

According to another embodiment of the present invention, a method of signal transmission of a flat panel device, comprising converting a digital signal to a switch control signal, providing N signal-lines, determining a plurality of current loops of the N signal-lines and transmitting a set of current signals on the plurality of current loops, and converting the set of current signals to a set of voltage signals, and performing a decoding operation to generating the digital signal according to the set of voltage signals, wherein N is not smaller than 4.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 is a truth table of the encoder in FIG. 7.

FIG. 13 is a truth table of the decoder in FIG. 7.

DETAILED DESCRIPTION

Figure 1:
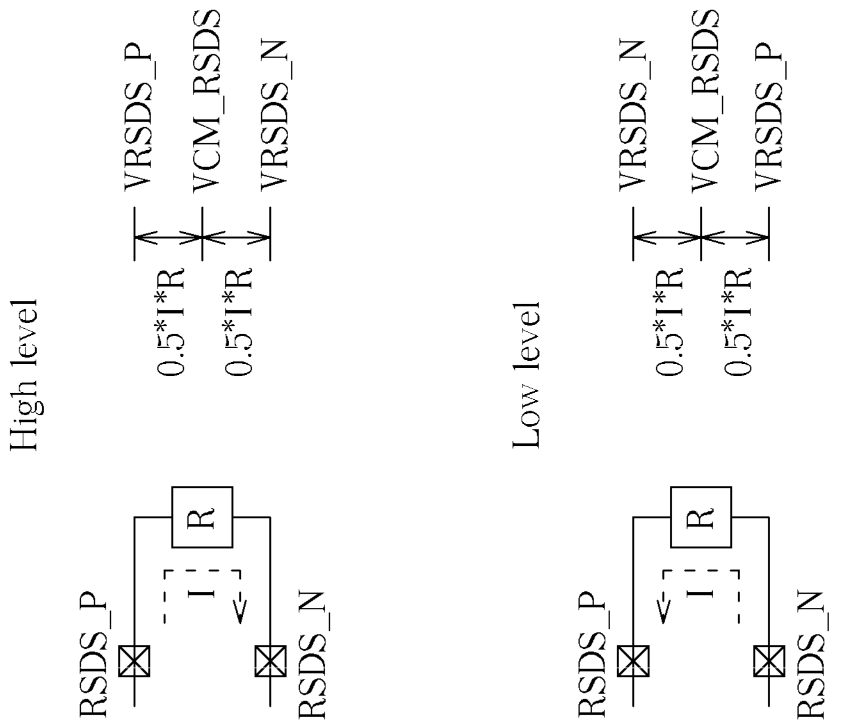
FIG. 1 PRIOR ART
FIG. 1 is a schematic diagram of circuits generating RSDS signals according to the prior art.
Figure 2:
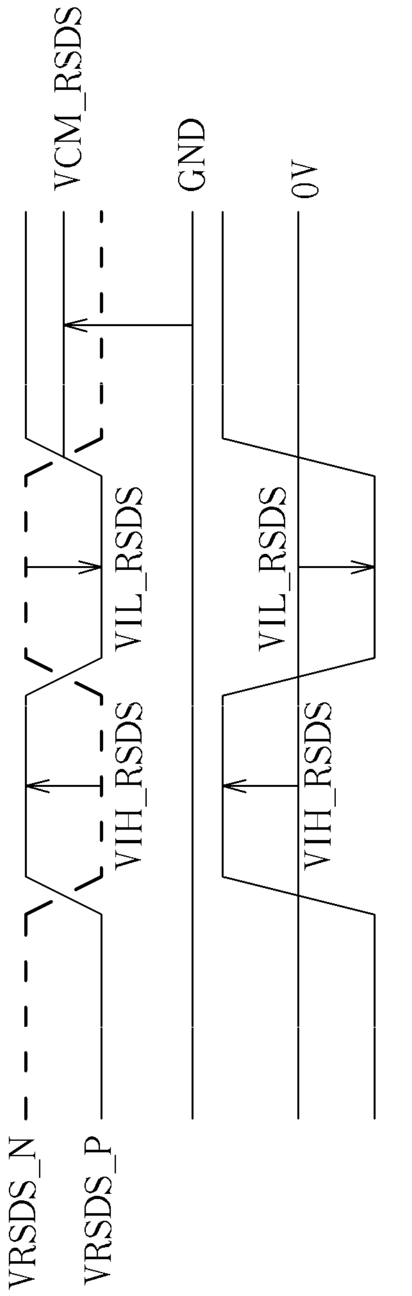
FIG. 2 PRIOR ART
FIG. 2 is a waveform diagram of RSDS signals.
Figure 3:
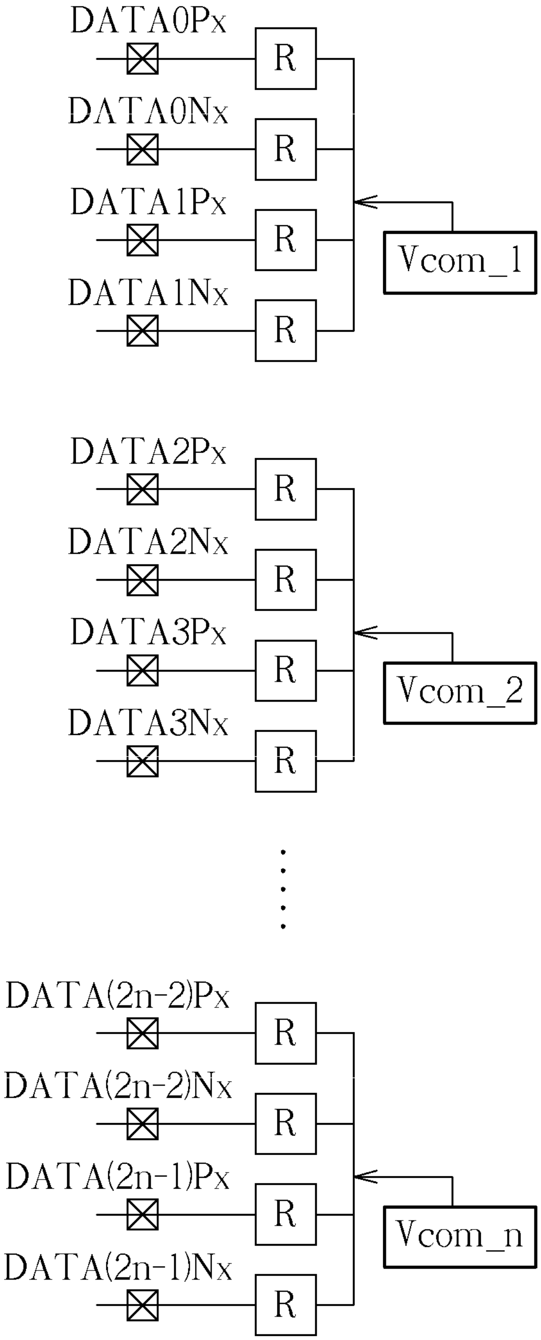
FIG. 3 is a schematic diagram of circuits generating current signals according to the present invention.

Please refer to FIG. 3. FIG. 3 is a schematic diagram of circuits generating current signals according to the present invention. In the present invention, the current is a medium for transmitting signals and carrying information, which can provide the higher capability of data transmission. When the current passes through a resistor, a voltage difference is generated between two ends of the resistor. The voltage difference changes as the current. Accordingly, terminal resistors R are installed at 4n terminations DATA0Px/Nx to DATA(2n−1)Px/Nx, wherein x indicates the signal-line connects to the xth source driver. Every 4 terminations are defined as a group, and each termination is coupled together through a terminal resistor. A common mode voltage is provided to each group. Thus, there are n groups and each group has a common mode voltage, as shown in FIG. 3. In each group, the current of a predetermined value is controlled to pass through the resistor in a predetermined loop so as to generate the voltage difference between two ends that the current passes. With the common mode voltage, when each termination has the corresponding current passed, a voltage level is generated in each termination. According to the combination of the different voltage levels, each combination can correspond to a digital signal. The length of the digital signal is a positive integer. For carrying information effectively in the current, the following rules are defined:

1. Determining current loops: the current passing through any two terminations forms a current loop, but the current cannot pass through the same termination twice.

2. The resistance of the terminal resistors in any current loop is the same.

3. All terminations have the current passed at the same time.

4. The value of the current passing through each termination is a constant. For a group of 4 signal-lines, the value of the current passing through each termination in each group is "al" and "bl".

5. The current loop of the current is predetermined so that the current can flow in the predetermined current loop.

6. The value of the current in any two current loops is different at the same time.

Figure 4:
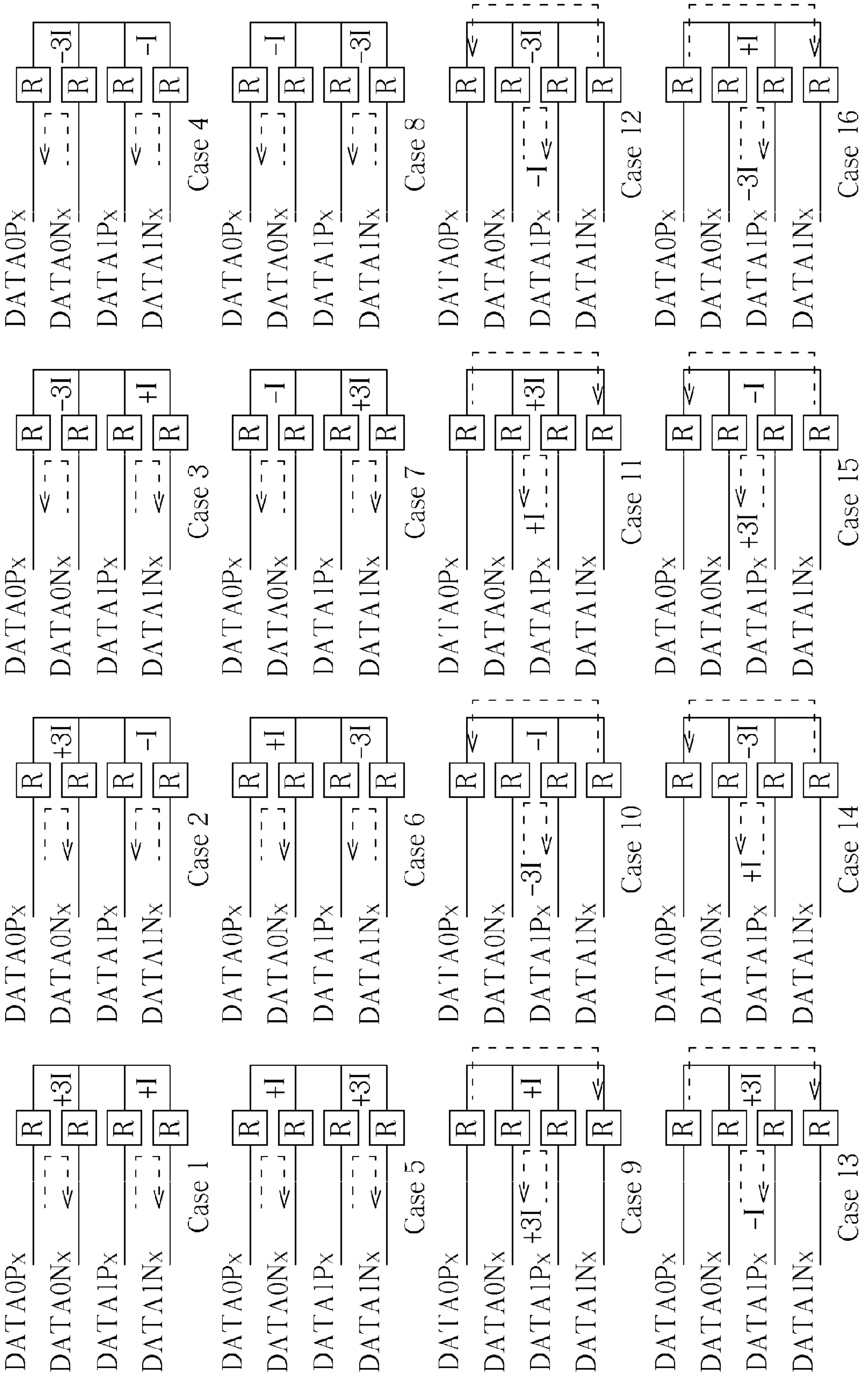
FIG. 4 is a schematic diagram of 16 cases of combinations of different current values and current loops according to the present invention.

Please refer to FIG. 4. FIG. 4 is a schematic diagram of 16 cases of combinations of different current values and current loops according to the present invention. This embodiment uses 4 signal-lines, 4 terminations DATA0Px, DATA0Nx, DATA1Px, and DATA1Nx, 4 terminal resistors R, and 4 current source 3*l*, −3*l*, *l*, and −l. One end of 4 terminal resistors is coupled to 4 terminations respectively, the other end of 4 terminal resistors is coupled together for receiving the common mode voltage Vcom_1. The 4 current loops in this embodiment:

Current loop 1: from DATA0Px to DATA0Nx or from DATA0Nx to DATA0Px;

Current loop 2: from DATA1Px to DATA1Nx or from DATA1Nx to DATA1Px;

Current loop 3: from DATA0Px to DATA1Nx or from DATA1Nx to DATA0Px;

Current loop 4: from DATA1Px to DATA0Nx or from DATA0Nx to DATA1Px.

In this embodiment, the value of the current passing through each termination "al" and "bl" are "3*l*" and "l" respectively. The combinations of different current values and current loops generate 16 cases. Each case has a group of voltage level at 4 terminations. The digital signal can correspond to 16 cases. It should be noted that the present invention does not limit the combinations of current values and current loops. For example, the current loops can be varied more than 4 current loops of the embodiment.

Figure 5:
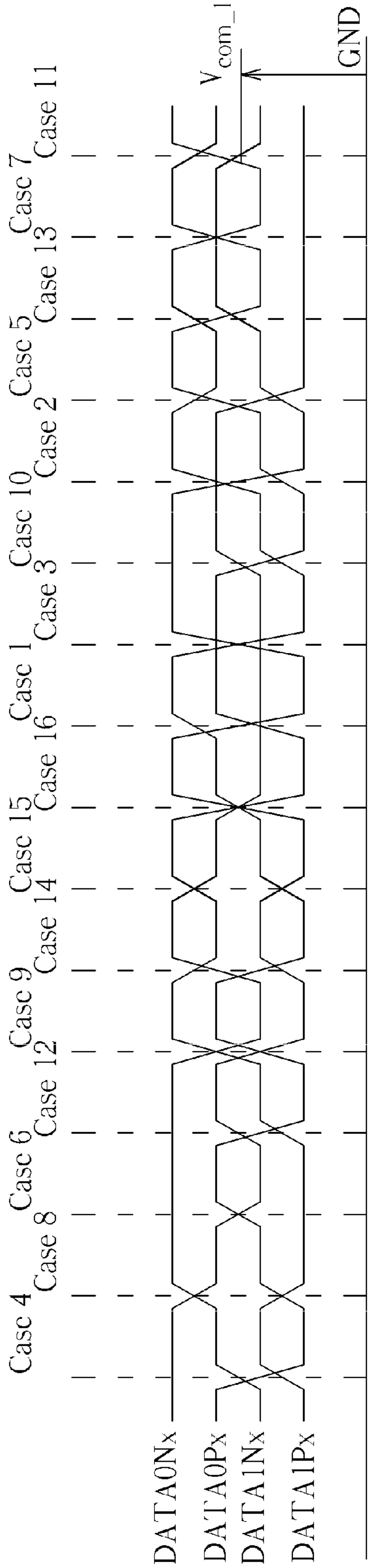
FIG. 5 is a waveform diagram of voltage levels of 16 cases in FIG. 4.

Please refer to FIG. 5. FIG. 5 is a waveform diagram of voltage levels of 16 cases in FIG. 4. Vcom_1 indicates the common mode voltage, which is the center level for the voltage levels of 4 terminations. In this embodiment, the value of the common mode voltage Vcom_1 is 1.2V, and the voltage swing is 170 mV. It should be noted that the voltage swing varies according to the value of the current and the terminal resistors. The common mode voltage Vcom_1 can be defined as any voltage, which is not limited to this embodiment. In addition, when the combinations of current value and current loops corresponding to the cases in FIG. 4 change, the waveforms in FIG. 5 change as well.

Figure 6:
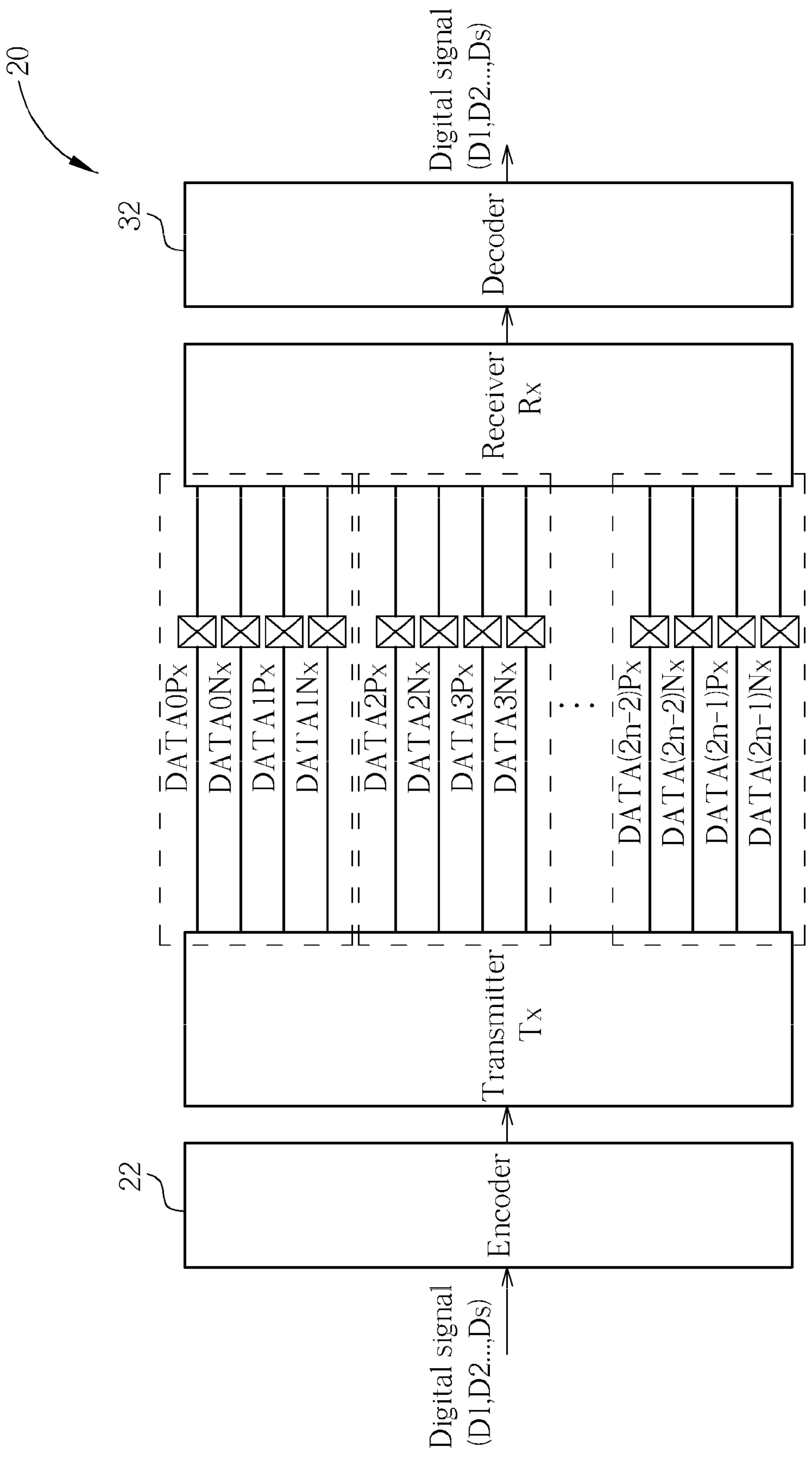
FIG. 6 is a schematic diagram of a signal transmission system of a flat panel device according to the present invention.

Please refer to FIG. 6. FIG. 6 is a schematic diagram of a signal transmission system 20 of a flat panel device according to the present invention. A digital signal (D1, D2 . . . , Ds) is converted by an encoder 22 to generate a switch control signal. The transmitter Tx generates a current signal according to the switch control signal and transmits the current signal to a receiver Rx through signal-lines. The receiver Rx utilizes terminal resistors to convert the current signal to a voltage signal, so that all terminations DATA0Px/Nx to DATA(2n−1)Px/Nx can have corresponding voltage levels. The signal transmission system 20 can generate each group of voltage levels in the same way. Thus, a decoder 32 receives the voltage level of each termination and obtains the digital signal according to the voltage levels of the terminations. As shown in FIG. 6, 4n signal-lines are coupled between the transmitter Tx and receiver Rx, so there are 4n terminations. Every 4 terminations are a group, and each group has a common mode voltage. A current passes through any two terminations of a group of 4 terminations, and a different value current passes through the other two terminations of the group of 4 terminations. Besides, the same current cannot pass through the same termination, so each signal-line has the current passed and generates the corresponding voltage levels at each termination. Each group of voltage level is responded to a digital signal. The length s (s is a positive integer) of the digital signal is determined by the group of voltage levels generated by the current passing through each termination.

Figure 7:
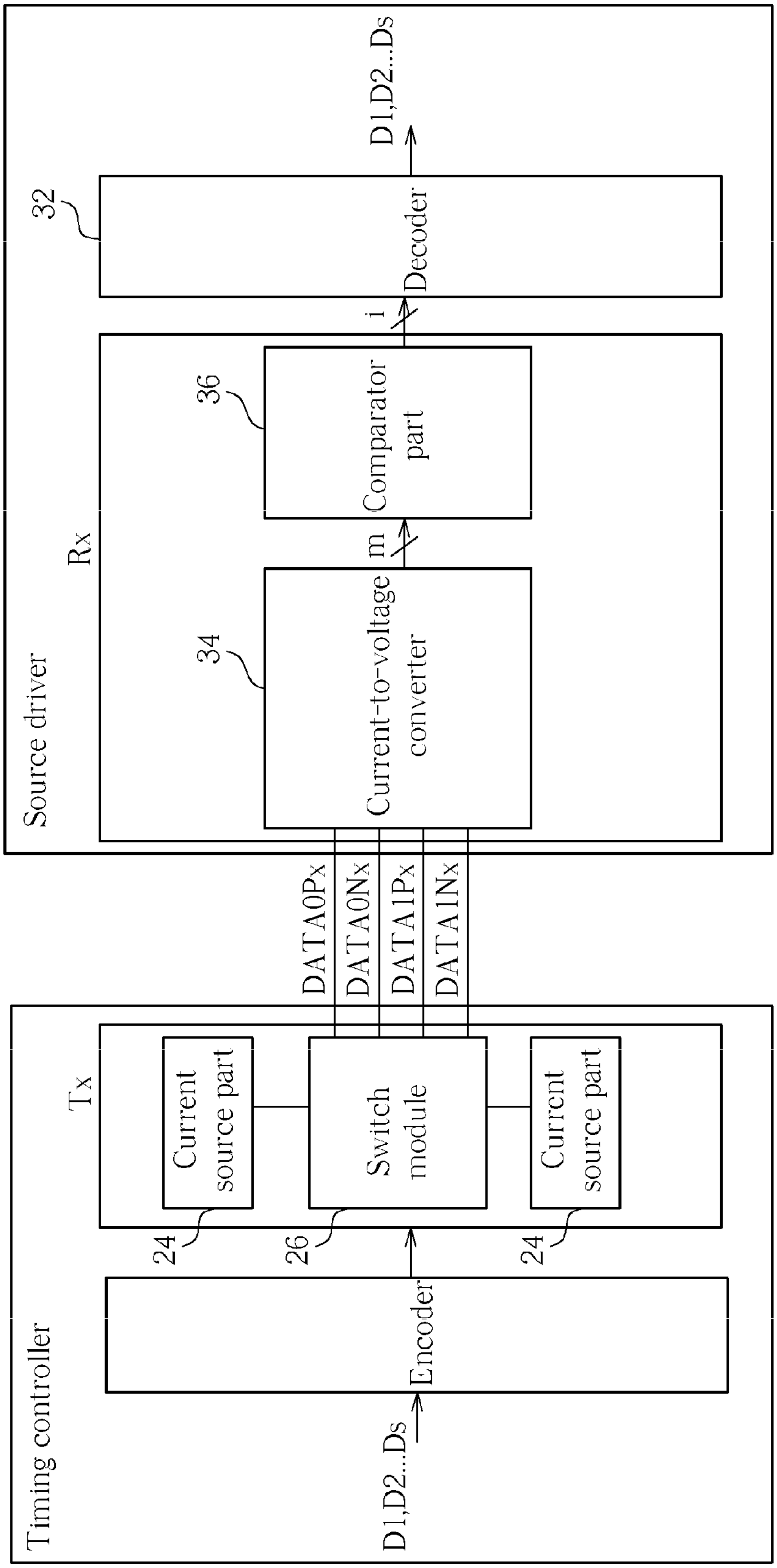
FIG. 7 is a block diagram of the transmitter Tx and the receiver Rx in FIG. 6.

Please refer to FIG. 7. FIG. 7 is a block diagram of the transmitter Tx and the receiver Rx in FIG. 6. In this embodiment, the encoder 22 and the transmitter Tx are installed in a timing controller of the flat panel device. The receiver Rx and the decoder 32 are installed in a source driver of the flat panel device. The transmitter Tx comprises a current source part 24 and a switch module 26. The receiver Rx comprises a current-to-voltage converter 34 and a comparator part 36. The current source part 24 comprises a plurality of current sources for providing current carrying information. The switch module 26 comprises a plurality of switches for selecting a predetermined current loop for the current. The current-to-voltage converter 34 is coupled to the comparator part 36 through m connecting lines for converting the current signal carrying information to the voltage signal, wherein m is a positive integer equal to or greater than 4. The comparator part 36 detects the voltage levels of each termination and transmits the result to the decoder 32 through i connecting lines, wherein i is a positive integer equal to or greater than 6. The decoder 32 generates the original digital signal (D1, D2 . . . , Ds) according to the output of the comparator part 36. The embodiments based on FIG. 7 are illustrated in FIGS. 8, 9, 10 and 11.

Figure 8:
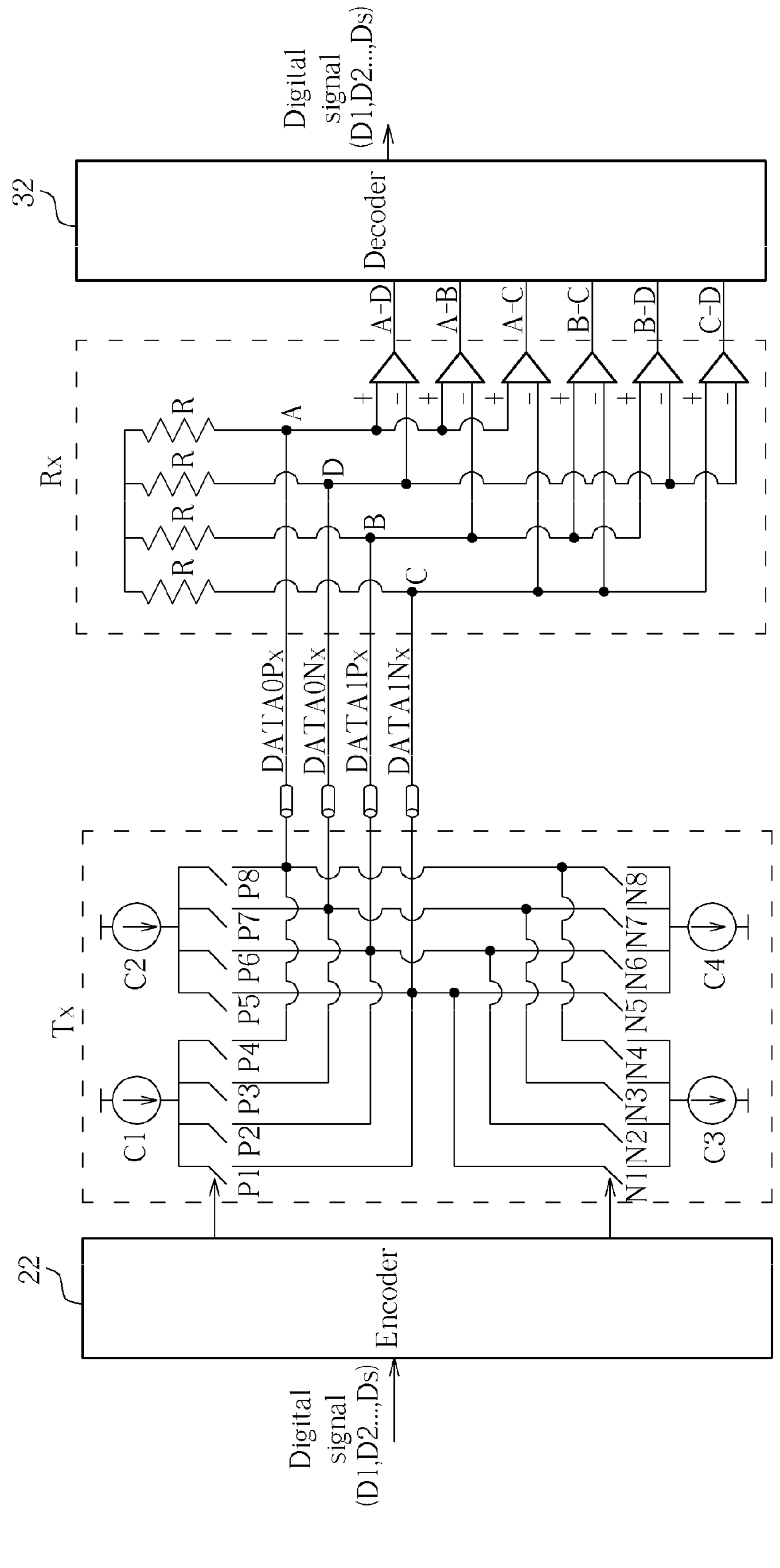
FIG. 8 is a schematic diagram of a first embodiment of FIG. 7.

Please refer to FIG. 8. FIG. 8 is a schematic diagram of a first embodiment of FIG. 7. This embodiment uses 4 signal-lines, the encoder 22, and the decoder 32. The transmitter Tx comprises 4 current sources C1, C2, C3, and C4. The value of the current source C1 and C3 is l. The value of the current source C2 and C4 is 3*l*. The switch module 26 comprises 16 switches P1 to P8 and N1 to N8. The receiver Rx comprises 4 terminal resistors R and 6 comparators (A-D, A-B, A-C, B-C, B-D, and C-D). The encoder 22 converts the digital signal to the switch control signal, so that one of 16 cases in FIG. 4 can be generated according to the switch control signal and the group of voltage levels can be generated at 4 terminations DATA0Px, DATA0Nx, DATA1Px, and DATA1Nx of the receiver Rx, wherein x indicates the signal-line connects to the xth source driver. The comparators of the receiver Rx compare the voltage difference between any two terminations and provide the result to the decoder 32 such that the decoder 32 is able to generate the original digital signal.

Figure 9:
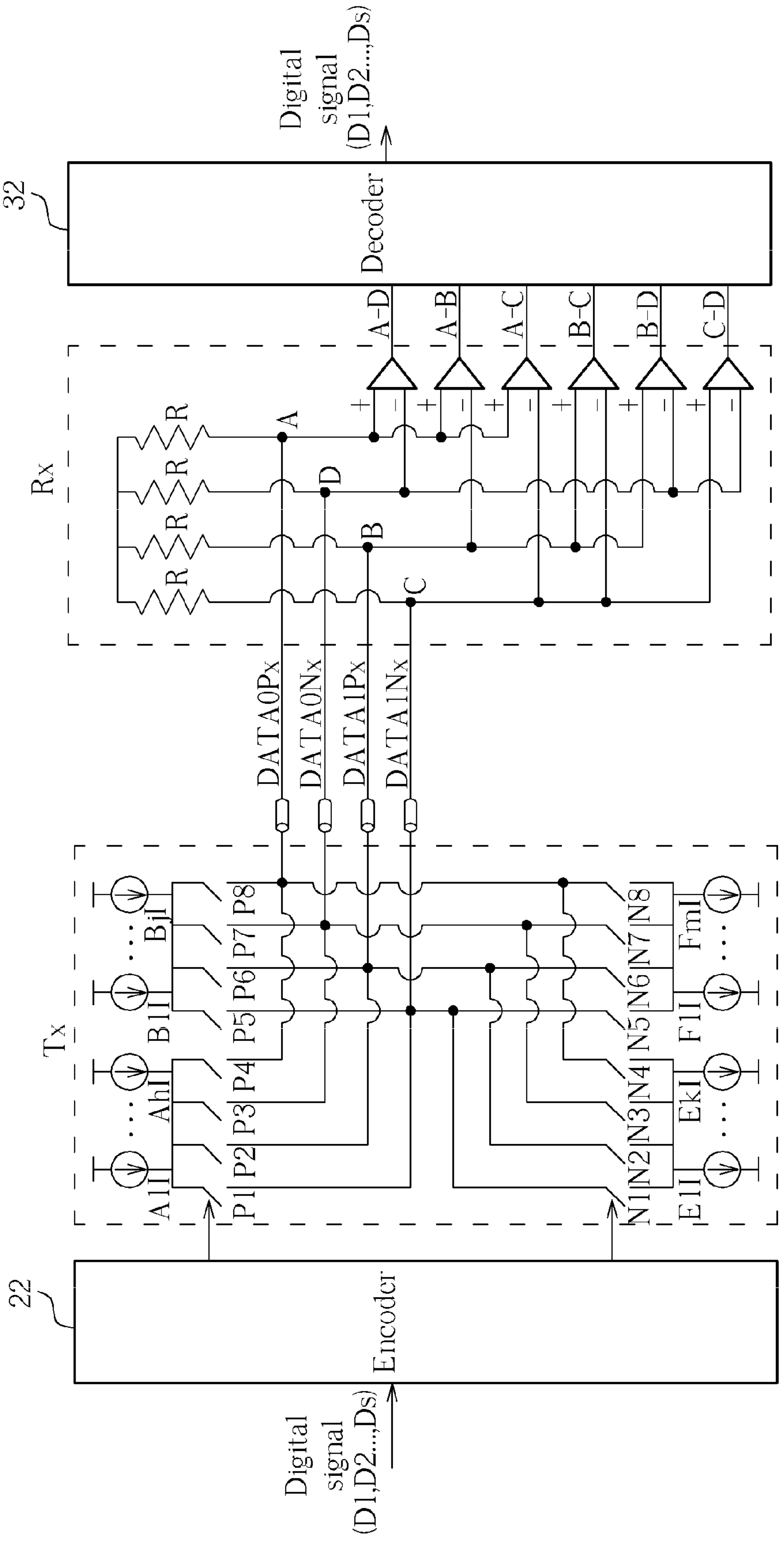
FIG. 9 is a schematic diagram of a second embodiment of FIG. 7.

Please refer to FIG. 9. FIG. 9 is a schematic diagram of a second embodiment of FIG. 7. The current sources C1, C2, C3, and C4 in FIG. 8 provide current C1, C2, C3, and C4 respectively. The current C1 passes through the switches P1~P4. The current C2 passes through the switches P5~P8. The current C3 passes through the switches N1~N4. The current C4 passes through the switches N5~N8. In this embodiment, the current C1 is provided by a plurality of current sources A1*l*~Ahl. The current C2 is provided by a plurality of current sources B1*l*~Bjl. The current C3 is provided by a plurality of current sources E1*l*~Ekl. The current C4 is provided by a plurality of current sources F1*l*~Fml.

Figure 10:
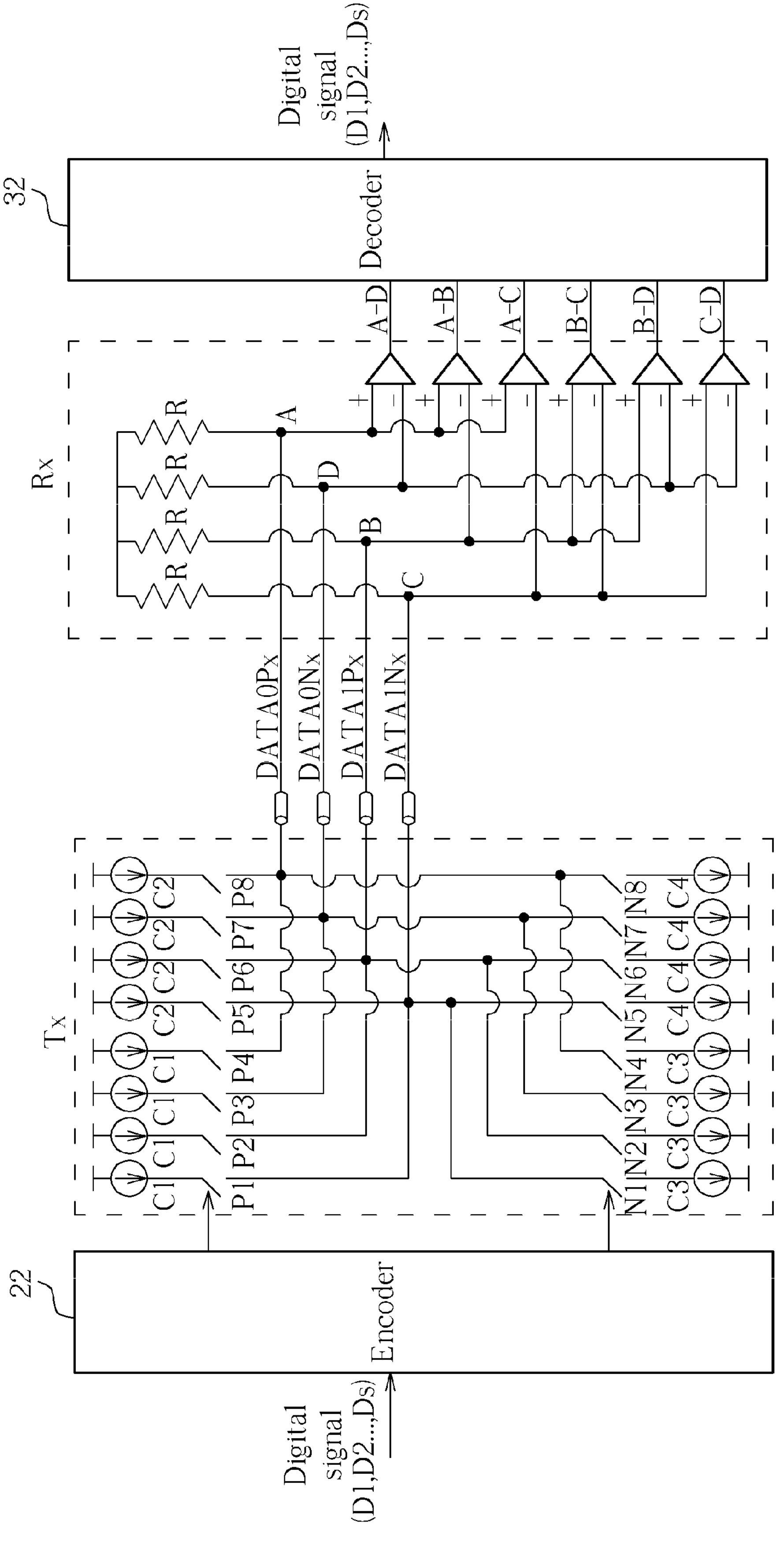
FIG. 10 is a schematic diagram of a third embodiment of FIG. 7.

Please refer to FIG. 10. FIG. 10 is a schematic diagram of a third embodiment of FIG. 7. The current sources C1, C2, C3, and C4 in FIG. 8 provide current C1, C2, C3, and C4 respectively. The current C1 passes through the switches P1~P4. The current C2 passes through the switches P5~P8. The current C3 passes through the switches N1~N4. The current C4 passes through the switches N5~N8. In this embodiment, the current passing through each switch is provided by a single current source. Each of the switches P1~P4 is coupled to the single current source C1. Each of the switches P5~P8 is coupled to the single current source C2. Each of the switches N1~N4 is coupled to the single current source C3. Each of the switches N5~N8 is coupled to the single current source C4.

Figure 11:
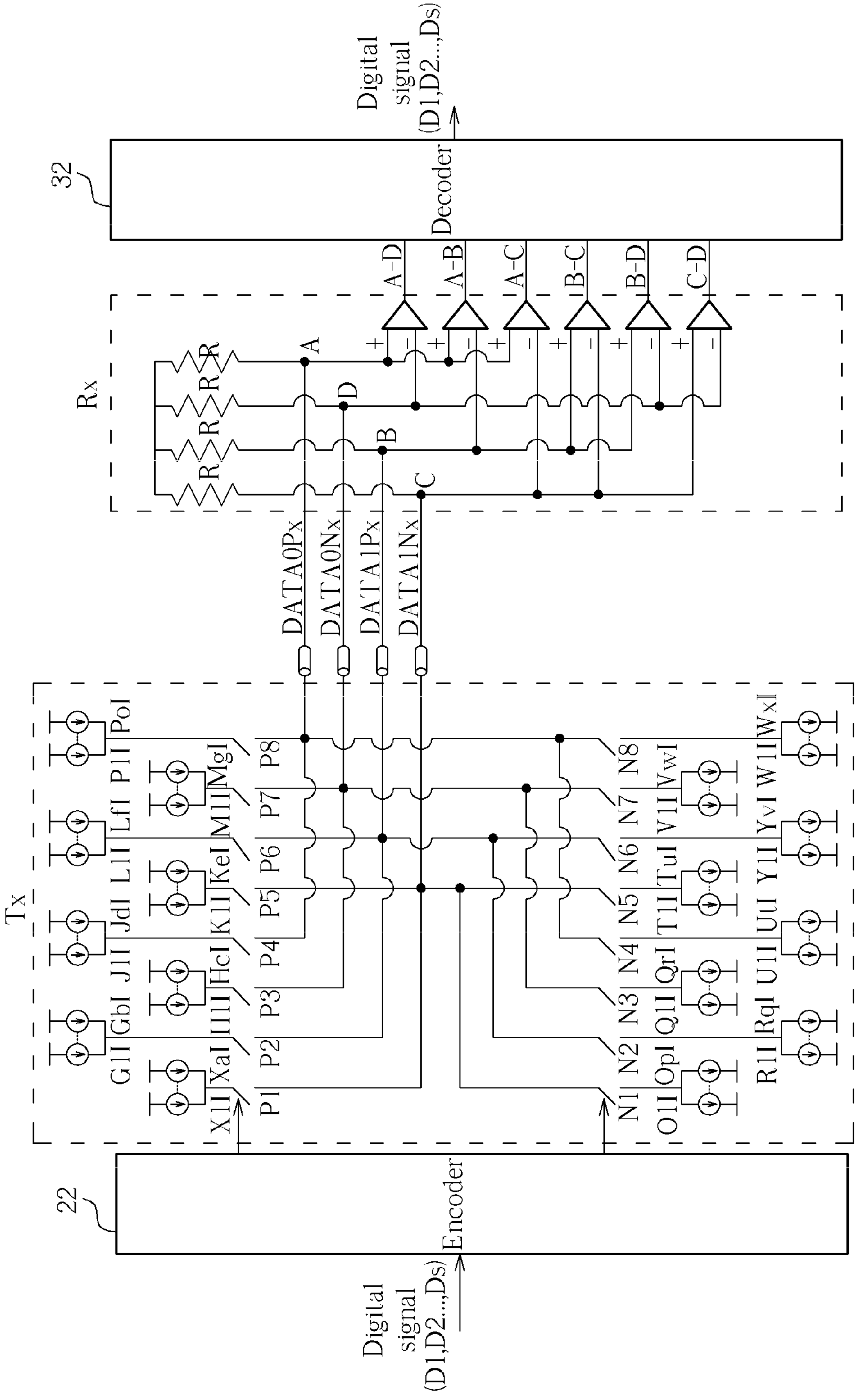
FIG. 11 is a schematic diagram of a fourth embodiment of FIG. 7.

Please refer to FIG. 11. FIG. 11 is a schematic diagram of a fourth embodiment of FIG. 7. The current sources C1, C2, C3, and C4 in FIG. 8 provide current C1, C2, C3, and C4 respectively. The current C1 passes through the switches P1~P4. The current C2 passes through the switches P5~P8. The current C3 passes through the switches N1~N4. The current C4 passes through the switches N5~N8. In this embodiment, the current passing through each switch is provided by a plurality of current sources. A plurality of current sources X1*l*~Xal provides the total current C1. A plurality of current sources G1*l*~Gb provides the total current C1. A plurality of current sources H1*l*~Hc provides the total current C1. A plurality of current sources J1*l*~Jdl provides the total current C1. A plurality of current sources K1*l*~Kel provides the total current C2. A plurality of current sources L1*l*~Lfl provides the total current C2. A plurality of current sources M1*l*~Mgl provides the total current C2. A plurality of current sources P1*l*~Pol provides the total current C2. A plurality of current sources O1*l*~Opl provides the total current C3. A plurality of current sources R1*l*~Rql provides the total current C3. A plurality of current sources Q1*l*~Qrl provides the total current C3. A plurality of current sources U1*l*~Utl provides the total current C3. A plurality of current sources T1*l*~Tul provides the total current C4. A plurality of current sources Y1*l*~Yvl provides the total current C4. A plurality of current sources V1*l*~Vwl provides the total current C4. A plurality of current sources W1*l*~Wxl provides the total current C4.

Please refer to FIG. 12. FIG. 12 is a truth table of the encoder 22 in FIG. 7. FIG. 4 shows 16 cases for the combinations of the current values and the current loops, and each combination corresponds to a digital signal. The length s of the digital signal is a positive integer smaller than or equal 4. In this embodiment, the length of the digital signal is 4 bits. When the digital signal is transmitted to the encoder 22, the encoder 22 generates the switch control signal according to the truth table in FIG. 12. The switch control signal controls the switches of the transmitter Tx so as to generate the corresponding combinations (cases) of the current values and the current loops. It should be noted that the digital signal corresponding to the combination of the current values and the current loops may have many ways, and the truth table in FIG. 12 is one kind of possibility. In addition, every 4 signal-lines can generate 16 ($4^2$) current loops, so 4n signal-lines can generate 16n current loops. Thus, the length of the digital signal is a positive integer smaller than or equal to 4n.

Please refer to FIG. 13. FIG. 13 is a truth table of the decoder 32 in FIG. 7. When the different current passes through the predetermined current loop, the voltage changes in the terminal resistor will generate the group of voltage levels at 4 terminations of the receiver Rx. The receiver Rx utilizes the comparators to detect the voltage change of each termination. In this embodiment, 6 comparators are used to detect the voltage difference between any two terminations of 4 terminations respectively. The comparator A-B detects the termination DATA0Px and DATA1Px (the positive end is coupled to DATA0Px, and the negative end is coupled to DATA1Px). The comparator A-C detects the termination DATA0Px and DATA1Nx (the positive end is coupled to DATA0Px, and the negative end is coupled to DATA1Nx). The comparator A-D detects the termination DATA0Px and DATA0Nx (the positive end is coupled to DATA0Px, and the negative end is coupled to DATA0Nx). The comparator B-C detects the termination DATA1Px and DATA1Nx (the positive end is coupled to DATA1Px, and the negative end is coupled to DATA1Nx). The comparator B-D detects the termination DATA1Px and DATA0Nx (the positive end is coupled to DATA1Px, and the negative end is coupled to DATA0Nx). The comparator C-D detects the termination DATA1Nx and DATA0Nx (the positive end is coupled to DATA1Nx, and the negative end is coupled to DATA0Nx). When the voltage of the positive end is greater than the negative end, the comparator will output "1". When the voltage of the positive end is smaller than the negative end, the comparator will output "0". It should be noted that the connection of the comparators is one kind of possibility. The connection of the comparators can vary in practice. In addition, the truth table of the decoder 32 corresponding to the comparators is one kind of possibility, and the truth will be modified as the connection of the comparators changes.

In conclusion, the present invention provides a system of controlling current to carry information and transmit signals for the data transmission of the flat panel device. A signal transmission system of a flat panel device according to the present invention comprises an encoder, a transmitter, a receiver, and a decoder. The encoder and the transmitter are installed in a timing controller of the flat panel device. The receiver and the decoder are installed in a source driver of the flat panel device. The encoder converts a digital signal to a switch control signal. The transmitter comprises 4n signal-lines (n is a positive integer), a plurality of current sources, and a plurality of switches. Every 4 signal-lines can represent 16 current signals so as to correspond to a digital signal of 4 bits. The receiver comprises 4n terminations, a plurality of terminal resistors, and a plurality of comparators. 4n terminations are coupled to 4n signal-lines and the plurality of terminal resistors. Every 4 terminations receive a current signal and generate a group of voltage levels through the plurality of terminal resistors. Each comparator is coupled between any two terminations so as to generate a group of voltage differences. The decoder converts the group of voltage differences to the digital signal. Thus, the signal transmission system of the flat panel device according to the present invention can provide the higher capability of data transmission Those skilled in the art will readily observe that numerous modifications and alterations of the device and method may be made while retaining the teachings of the invention.

What is claimed is:

1. A signal transmission system of a flat panel device, comprising:

an encoder for converting an N-bit digital signal to a switch control signal;

a signal transmitting module, comprising:

a transmitter coupled to the encoder, comprising:

at least one first current source for providing a first current;

at least one second current source for providing a second current different from the first current, wherein a value of the first current is a non-zero current value and a value of the second current is a non-zero current value;

N signal lines; and a switch module, coupled to the N signal lines, the at least one first current source and the least one second current source, for controlling the first current to flow through a first signal line and a second signal line of the N signal lines and controlling the second current to flow through a third signal line and a fourth signal line of the N signal lines during a first time period, and for controlling the first current to flow through the second signal line and the third signal line and controlling the second current to flow through the first signal line and the fourth signal line during a second time period; and a receiver, comprising:

N terminal resistors having first ends coupled to the N signal lines respectively, for generating a plurality of voltage levels according to the first current and the second current; and a plurality of comparators, for comparing voltage levels between each pair of the terminal resistors to generate a group of comparison results; and a decoder coupled to the receiver for converting the group of comparison results to the N-bit digital signal;

wherein N is equal to a power of two.

2. The signal transmission system of claim 1, wherein the encoder and the transmitter are installed in a timing controller of the flat panel device.

3. The signal transmission system of claim 1, wherein the receiver and the decoder are installed in a source driver of the flat panel device.

4. The signal transmission system of claim 1, wherein the N terminal resistors have second ends receiving a common mode voltage.

5. The signal transmission system of claim 1, wherein the at least one first current source and the at least one second current source are coupled to a plurality of switches of the switch module.

6. The signal transmission system of claim 1, wherein the at least one first current source and the at least one second current source comprise a plurality of secondary current sources.

7. The signal transmission system of claim 1, wherein resistances of the N terminal resistors are equal.

8. A method of signal transmission of a flat panel device, comprising:

converting an N-bit digital signal to a switch control signal;

providing N signal lines coupled to N terminal resistors respectively;

controlling a first current generated by at least one first current source to flow through a first signal line and a second signal line of the N signal lines and controlling a second current generated by at least one second current source to flow through a third signal line and a fourth signal line of the N signal lines during a first time period;

controlling the first current to flow through the second signal line and the third signal line and controlling the second current to flow through the first signal line and the fourth signal line during a second time period;

comparing voltage levels between each pair of the terminal resistors to generate a group of comparison results; and converting the group of comparison results to the N-bit digital signal;

wherein a value of the first current is a non-zero current value and a value of the second current is a non-zero current value not equal to the first current; and wherein N is equal to a power of two.

* * * * *